US012589454B2

(12) United States Patent      (10) Patent No.:   US 12,589,454 B2

Liu      (45) Date of Patent:      Mar. 31, 2026

(54) WELDING FINISHING DEVICE

(71) Applicant: Jiangsu Yingliu Machine Manufacturing Co., Ltd., Yancheng City (CN)

(72) Inventor: Wei Liu, Yancheng City (CN)

(73) Assignee: Jiangsu Yingliu Machine Manufacturing Co., Ltd., Jiangsu City (CN)

( * ) Notice: Subject to any disclaimer, the term of this patent is extended or adjusted under 35 U.S.C. 154(b) by 524 days.

(21) Appl. No.: 18/217,698

(22) Filed: Jul. 3, 2023

(65) Prior Publication Data

US 2024/0024992 A1     Jan. 25, 2024

(30) Foreign Application Priority Data

Jul. 21, 2022    (CN) ......................... 202210858593.X

(51) Int. Cl.
B23K 37/08 (2006.01)
B23P 23/04 (2006.01)
B24B 29/04 (2006.01)

(52) U.S. Cl.
CPC .............. B23K 37/08 (2013.01); B23P 23/04 (2013.01); B24B 29/04 (2013.01)

(58) Field of Classification Search
CPC ...... B23K 37/08; B23K 11/046; B23K 11/36; B23P 23/04; B24B 29/04
See application file for complete search history.

(56) References Cited

U.S. PATENT DOCUMENTS 4,214,143 A * 7/1980 Kawanami ........... B23K 11/046
439/11

* cited by examiner

*Primary Examiner* — Lee A Holly
(74) *Attorney, Agent, or Firm* — Sulter Swantz IP

(57) ABSTRACT

A welding finishing device is provided. The welding finishing device comprises a base. Supporting rods are fixedly mounted on the left side and the right side of an outer surface of an upper end of the base. A top plate is fixedly mounted on outer surfaces of upper ends of the supporting rods. A finishing assembly is fixedly mounted in the middle of an outer surface of a lower end of the top plate. A workpiece is provided in the middle of the outer surface of the upper end of the base. A welding seam protruding part is provided in the middle of the workpiece. Positioning assemblies are fixedly mounted on the left side and the right side of the outer surface of the upper end of the base. The finishing assembly comprises a second sliding chute forming in the outer surface of the lower end of the top plate.

6 Claims, 5 Drawing Sheets

34

33

WELDING FINISHING DEVICE

CROSS-REFERENCE TO RELATED APPLICATION

This patent application claims the benefit and priority of Chinese Patent Application No. 202210858593.X filed with the China National Intellectual Property Administration on Jul. 21, 2022, the disclosure of which is incorporated by reference herein in its entirety as part of the present application.

TECHNICAL FIELD

The present disclosure relates to the technical field of welding finishing equipment, in particular to a welding finishing device.

BACKGROUND

Flash welding is a resistance welding method. When current passes through contact surfaces of two butted workpieces, the resistance of tiny contact points and arcs on the contact surfaces generate heat to heat the butted surfaces. After a proper period of time, pressure is applied to joints, so that the whole areas of the two butted surfaces are firmly combined at the same time. The range of a heat affected zone of flash welding is extremely small. Surface oxides and other impurities are removed as sparks and are not mixed into welds, so that the reliability of the welds is high. Flash welding includes flash welding and upsetting processes. The welding quality is ensured in the flash welding process. In the upsetting process, upsetting pressure is applied to extrude all molten metal on a joint surface when short sections of the parts, protruding from an electric level, of two workpieces reach a temperature with good plasticity, and the two workpieces are firmly forged together. Because the molten metal is extruded in the upsetting process, a welding seam protruding part protruding from an outer surface of the workpiece is formed. Therefore, in order to ensure a smooth and flat surface of the workpiece, after welding, the part larger than the welding seam protruding part must be removed. However, in the prior art, there is a lack of equipment or device for finishing a circular weld of flash welding, resulting in the fact that the circular weld of flash welding can only be manually polished by electric tools to cause the problems of potential safety hazards and low production efficiency. Certain adverse effects are generated in the using process. Therefore, a welding finishing device is proposed.

SUMMARY

(I) Technical Problems to be Solved

Aiming at the defects in the prior art, the present disclosure provides a welding finishing device. The welding finishing device has the advantages that a workpiece is conveniently limited and fixed and the workpiece is conveniently cleaned and polished, and can effectively solve the problems in the background technology.

(II) Technical Solutions

In order to achieve the purpose, the technical solutions adopted by the present disclosure are as follows. A welding finishing device includes a base. Supporting rods are fixedly mounted on a left side and ta right side of an outer surface of an upper end of the base. A top plate is fixedly mounted on outer surfaces of upper ends of the supporting rods. A finishing assembly is fixedly mounted in a middle of an outer surface of a lower end of the top plate. A workpiece is provided in a middle of the outer surface of the upper end of the base. A welding seam protruding part is provided in a middle of the workpiece. Positioning assemblies are fixedly mounted on the left side and the right side of the outer surface of the upper end of the base. The finishing assembly includes a second sliding chute, a second sliding block, a double-shaft air cylinder, a mounting block, a second mounting plate, a first air cylinder, a motor, a polishing disc, a rotating shaft, a cutter, a mounting disc, a second air cylinder and a movable block. The second sliding chute is formed in the outer surface of the lower end of the top plate. The mounting block is fixedly mounted on a right side of an outer surface of a lower end of the base. The double-shaft air cylinder is fixedly mounted on an outer surface of the left side of the mounting block. The second sliding block is fixedly mounted on an outer surface of an upper end of the movable block.

Preferably, the second mounting plate is fixedly mounted on an outer surface of a lower end of the movable block. The second air cylinder is fixedly mounted on a left side of an outer surface of a lower end of the second mounting plate. The first air cylinder is fixedly mounted on a right side of the outer surface of the lower end of the second mounting plate. The mounting disc is fixedly mounted on an outer surface of a lower end of the second air cylinder. The cutter is fixedly mounted on an outer surface of a lower end of the mounting disc. The motor is fixedly mounted on an outer surface of a lower end of the first air cylinder. The rotating shaft is located on an outer surface of a lower end of the motor. The polishing disc is fixedly mounted on an outer surface of a lower end of the rotating shaft. The second sliding block and the second sliding chute are in sliding connection.

Preferably, the positioning assembly includes a substrate, a first sliding chute, skidproof stripes, a squeezing plate, a first screw, a first knob, a first fixed block, a first threaded hole, a first sliding block, a compressing block, a second threaded hole, a second knob, a second screw, a first mounting plate and a second fixed block. An outer surface of a lower end of the substrate is fixedly connected with an outer surface of an upper end of the base. The first sliding chute is formed in a middle of an outer surface of an upper end of the substrate. The first fixed block is fixedly mounted on a left side of the outer surface of the upper end of the substrate. The second fixed block is fixedly mounted on a right side of the outer surface of the upper end of the substrate. The limited block is fixedly mounted at a lower part of an outer surface of a left side of the second fixed block.

Preferably, the first threaded hole is formed in a middle of the first fixed block. The first screw penetrates through the first threaded hole. The first knob is fixedly mounted on an outer surface of one end of the first screw. The squeezing plate is located on an outer surface of another end of the first screw. The first sliding block is fixedly mounted in a middle of an outer surface of a lower end of the squeezing plate. The first mounting plate is fixedly mounted at an upper part of the outer surface of the left side of the second fixed block. The second threaded hole is formed in a middle of the first mounting plate. The second knob is fixedly mounted on an outer surface of an upper end of the second screw. The compressing block is located on an outer surface of a lower end of the second screw.

Preferably, the skidproof stripes are provided on an outer surface of one side of the squeezing plate and an outer surface of one side of the limit block. The first screw and the first threaded hole are in threaded connection. The second screw and the second threaded hole are in threaded connection. The first sliding block and the first sliding chute are in sliding connection.

Preferably, a sealing bearing is provided between the first screw and the squeezing plate. The first screw is movably connected with the squeezing plate through the sealing bearing. A sealing bearing is provided between the compressing block and the second screw. The lower part of the second screw is movably connected with the compressing block through the sealing bearing.

(III) Beneficial Effects

Compared with the prior art, the present disclosure provides a welding finishing device. The welding finishing device has the following beneficial effects.

Firstly, according to the welding finishing device, through the provided positioning assembly, the workpiece is placed on the outer surface of the upper end of the substrate. By rotating the first knob, the first screw is driven to advance along the first threaded hole. One end of the first screw drives the squeezing plate to move, so that one end of the workpiece is squeezed between the squeezing plate and the limited block. The stability is increased through the provided skidproof stripes. By rotating the second knob, the second screw is driven to descend along a thread of the second threaded hole. When the second screw reach the pressure drop of the compressing block, the upper part of the workpiece is clamped and fixed, so that the stability is further increase. The moving stability of the squeezing plate is increased through the provided first sliding block and first sliding chute.

Secondly, after the workpiece is fixed by the positioning assembly, the cutter is driven to descend by the operation of the second air cylinder. The cutter cuts the welding seam protruding part on the workpiece through the cooperation of the double-shaft air cylinder and the second air cylinder, and then the second air cylinder drives the cutter to reset. The first air cylinder drives the polishing disc to descend. The polishing disc is driven to rotate by the operation of the motor, and the cut part is polished, so that the efficiency is high.

Reference signs: 1, base; 2, supporting rod; 3, top plate; 4, finishing assembly; 5, welding seam protruding part; 6, workpiece; 7, positioning assembly; 8, substrate; 9, first sliding chute; 10, skidproof stripe; 11, squeezing plate; 12, first screw; 13, first knob; 14, first fixed block; 15, first threaded hole; 16, first sliding block; 17, compressing block;

18, second threaded hole; 19, second knob; 20, second screw; 21, first mounting plate; 22, second fixed block; 23, limited block; 24, second sliding chute; 25, second sliding block; 26, double-shaft air cylinder; 27, mounting block; 28, second mounting plate; 29, first air cylinder; 30, motor; 31, polishing disc; 32, rotating shaft; 33, cutter; 34, mounting disc; 35, second air cylinder; and 36, movable block.

DETAILED DESCRIPTION OF THE EMBODIMENTS

In order to easily understand the technical means, creative features, achievement purposes and efficacy of the present disclosure, the present disclosure is further described below in conjunction with specific embodiments.

Embodiment I

In the present embodiment, disclosed is a welding finishing device.

Figure 1:
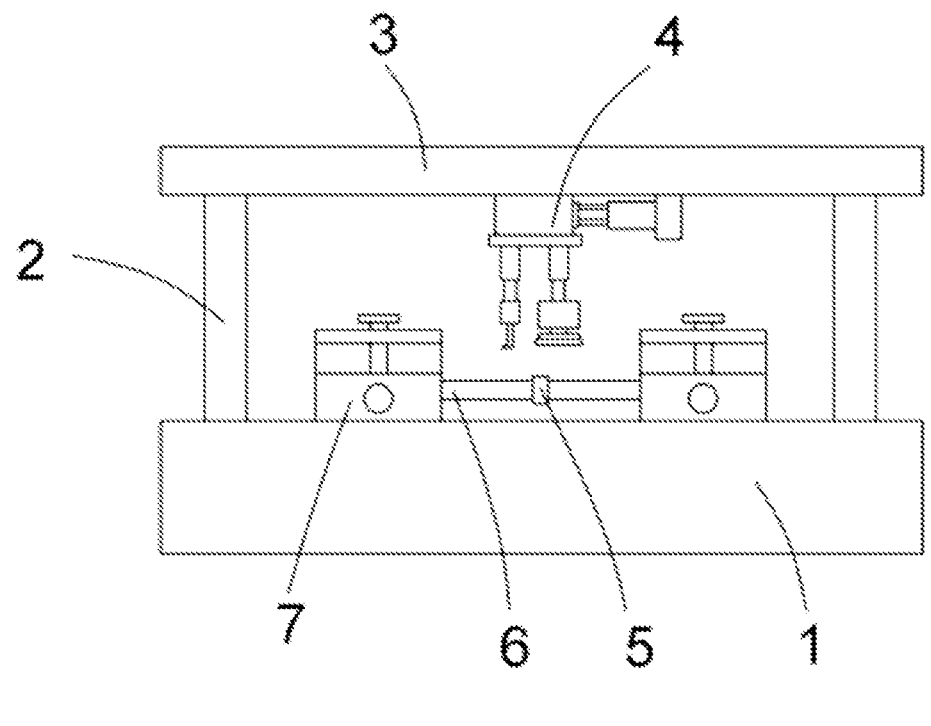
FIG. 1 is an overall structural schematic diagram of a welding finishing device in the present disclosure.
Figure 2:
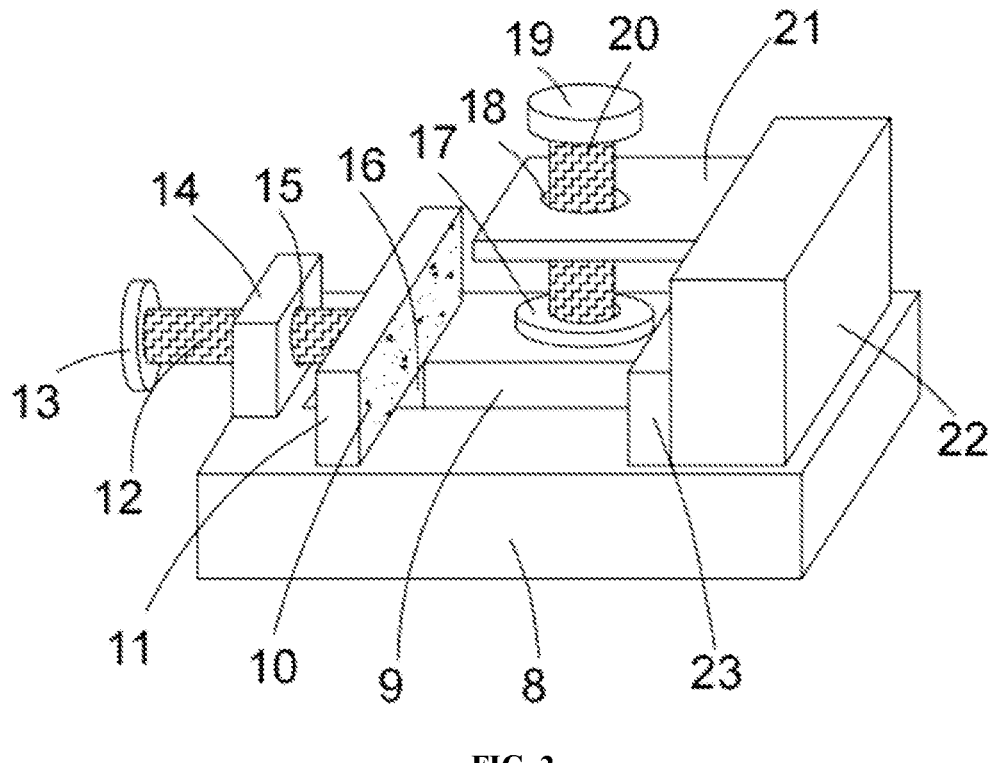
FIG. 2 is a structural schematic diagram of a positioning assembly in a welding finishing device in the present disclosure.
Figure 3:
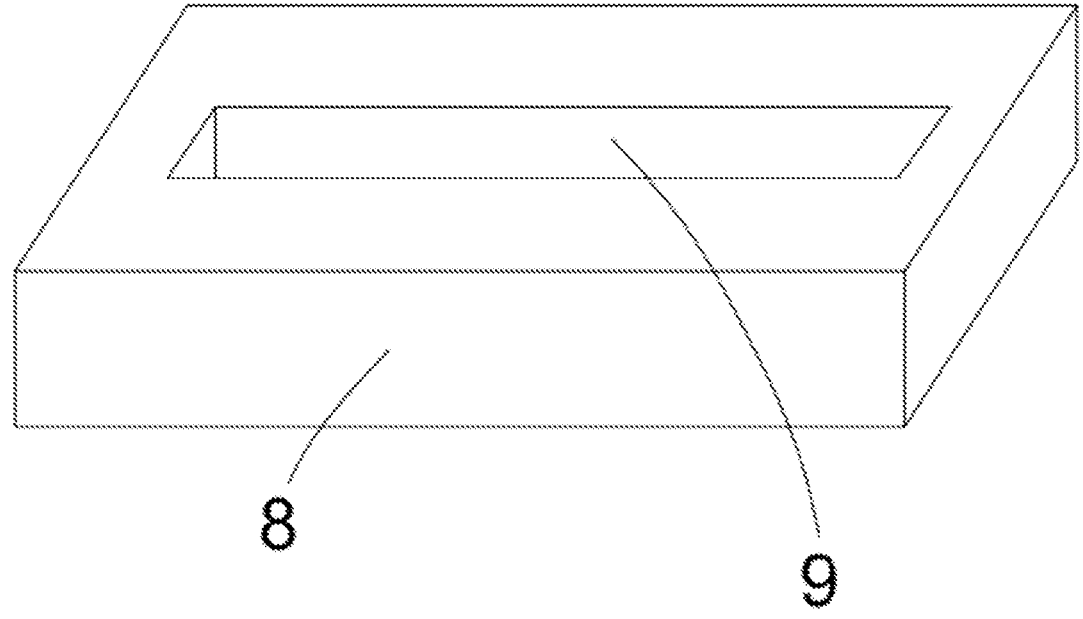
FIG. 3 is a structural schematic diagram of a substrate in a welding finishing device in the present disclosure.
Figure 4:
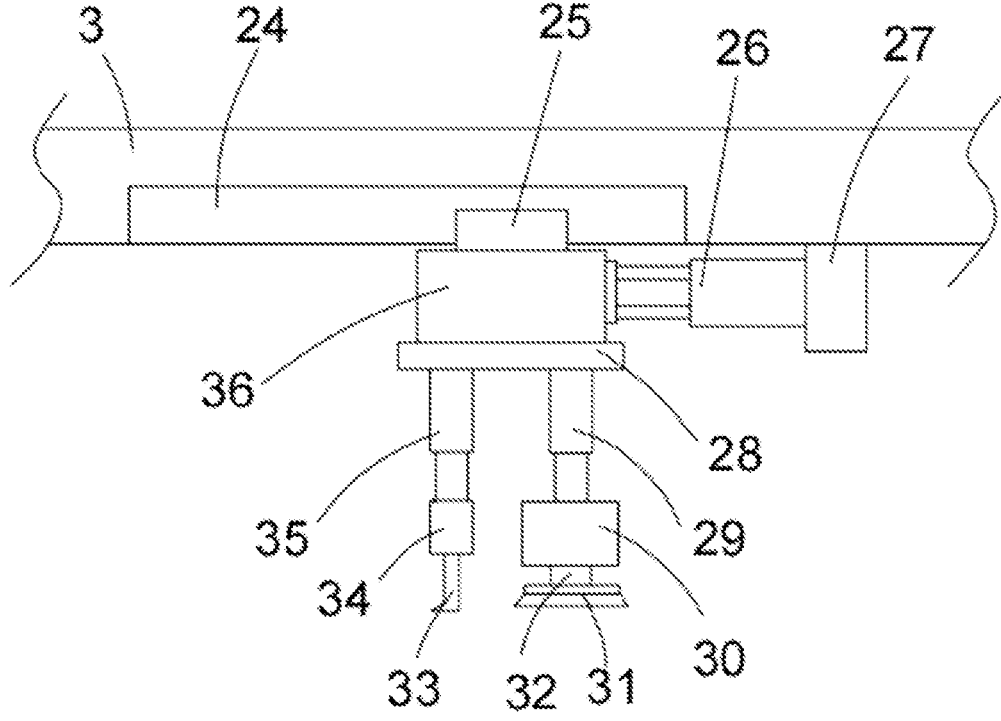
FIG. 4 is a structural schematic diagram of a finishing assembly in a welding finishing device in the present disclosure.
Figure 5:
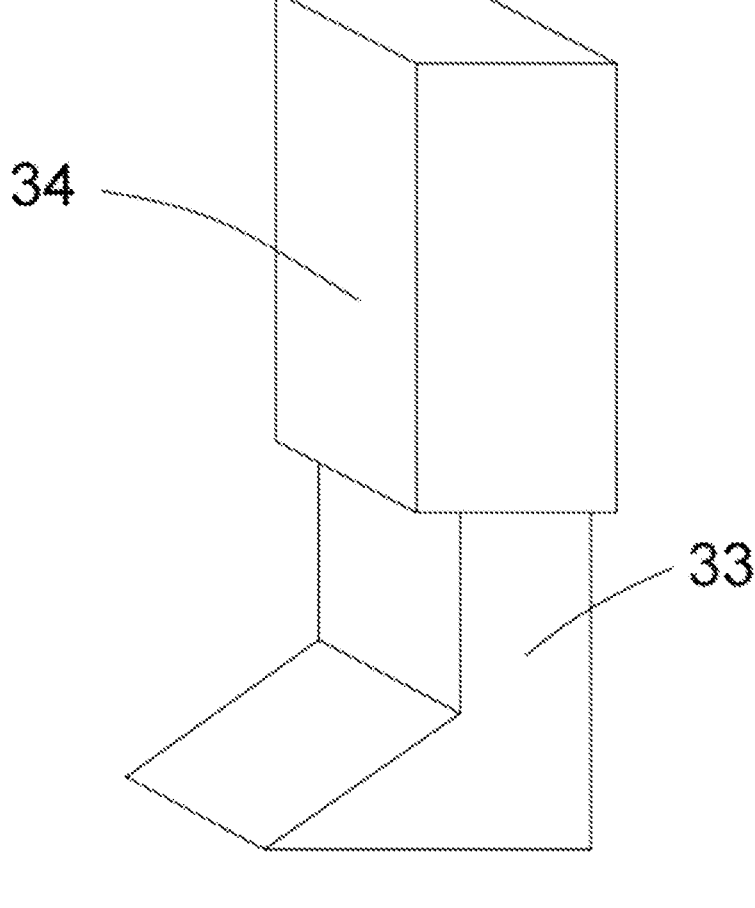
FIG. 5 is a structural schematic diagram of a cutter in a welding finishing device in the present disclosure.

As shown in FIG. 1 to FIG. 5, the welding finishing device includes a base 1. Supporting rods 2 are fixedly mounted on the left side and the right side of an outer surface of an upper end of the base 1. A top plate 3 is fixedly mounted on outer surfaces of upper ends of the supporting rods 2. A finishing assembly 4 is fixedly mounted in the middle of an outer surface of a lower end of the top plate 3. A workpiece 6 is provided in the middle of the outer surface of the upper end of the base 1. A welding seam protruding part 5 is provided in the middle of the workpiece 6. Positioning assemblies 7 are fixedly mounted on the left side and the right side of the outer surface of the upper end of the base 1. The finishing assembly 4 includes a second sliding chute 24, a second sliding block 25, a double-shaft air cylinder 26, a mounting block 27, a second mounting plate 28, a first air cylinder 29, a motor 30, a polishing disc 31, a rotating shaft 32, a cutter 33, a mounting disc 34, a second air cylinder 35 and a movable block 36. The second sliding chute 24 is formed in the outer surface of the lower end of the top plate 1. The mounting block 27 is fixedly mounted on the right side of an outer surface of a lower end of the base 1. The double-shaft air cylinder 26 is fixedly mounted on an outer surface of the left side of the mounting block 27. The second sliding block 25 is fixedly mounted on an outer surface of an upper end of the movable block 36.

The second mounting plate 28 is fixedly mounted on an outer surface of a lower end of the movable block 36. The second air cylinder 35 is fixedly mounted on the left side of an outer surface of a lower end of the second mounting plate 28. The first air cylinder 29 is fixedly mounted on the right side of the outer surface of the lower end of the second mounting plate 28. The mounting disc 34 is fixedly mounted on an outer surface of a lower end of the second air cylinder 35. The cutter 33 is fixedly mounted on an outer surface of a lower end of the mounting disc 34. The motor 30 is fixedly mounted on an outer surface of a lower end of the first air cylinder 29. The rotating shaft 32 is located on an outer surface of a lower end of the motor 30. The polishing disc 31 is fixedly mounted on an outer surface of a lower end of the rotating shaft 32. The second sliding block 25 and the second sliding chute 24 are in sliding connection. The positioning assembly 7 includes a substrate 8, a first sliding chute 9, skidproof stripes 10, a squeezing plate 11, a first screw 12, a first knob 13, a first fixed block 14, a first threaded hole 15, a first sliding block 16, a compressing block 17, a second threaded hole 18, a second knob 19, a second screw 20, a first mounting plate 21 and a second fixed block 22. An outer surface of a lower end of the substrate 8 is fixedly connected with an outer surface of an upper end of the base 1. The first sliding chute 9 is formed in the middle of an outer surface of an upper end of the substrate 8. The first fixed block 14 is fixedly mounted on the left side of the outer surface of the upper end of the substrate 8. The second fixed block 22 is fixedly mounted on the right side of the outer surface of the upper end of the substrate 8. The limited block 23 is fixedly mounted at the lower part of an outer surface of the left side of the second fixed block 22. The first threaded hole 15 is formed in the middle of the first fixed block 14. The first screw 12 penetrates through the first threaded hole 15. The first knob 13 is fixedly mounted on an outer surface of one end of the first screw 12. The squeezing plate 11 is located on an outer surface of the other end of the first screw 12. The first sliding block 16 is fixedly mounted in the middle of an outer surface of a lower end of the squeezing plate 11. The first mounting plate 21 is fixedly mounted at the upper part of an outer surface of the left side of the second fixed block 22. The second threaded hole 18 is formed in the middle of the first mounting plate 21. The second knob 19 is fixedly mounted on an outer surface of an upper end of the second screw 20. The compressing block 17 is located on an outer surface of a lower end of the second screw 20. The skidproof stripes 10 are provided on an outer surface of one side of the squeezing plate 11 and an outer surface of one side of the limit block 23. The first screw 12 and the first threaded hole 15 are in threaded connection. The second screw 20 and the second threaded hole 18 are in threaded connection. The first sliding block 16 and the first sliding chute 9 are in sliding connection. A sealing bearing is provided between the first screw 12 and the squeezing plate 11. The first screw 12 is movably connected with the squeezing plate 11 through the sealing bearing. A sealing bearing is provided between the compressing block 17 and the second screw 20. The lower part of the second screw 20 is movably connected with the compressing block 17 through the sealing bearing.

It should be noted that disclosed is a welding finishing device. Through the provided positioning assembly 7, the workpiece 6 is placed on the outer surface of the upper end of the substrate 8. By rotating the first knob 13, the first screw 12 is driven to advance along the first threaded hole 15. One end of the first screw 12 drives the squeezing plate 11 to move, so that one end of the workpiece 6 is squeezed between the squeezing plate 11 and the limited block 23. The stability is increased through the provided skidproof stripes 10. By rotating the second knob 19, the second screw 20 is driven to descend along a thread of the second threaded hole 18. When the second screw 20 reach the pressure drop of the compressing block 17, the upper part of the workpiece 6 is clamped and fixed, so that the stability is further increase. The moving stability of the squeezing plate 11 is increased through the provided first sliding block 16 and first sliding chute 9. After the workpiece 6 is fixed by the positioning assembly 7, the cutter 33 is driven to descend by the operation of the second air cylinder 35. The cutter 33 cuts the welding seam protruding part 5 on the workpiece 6 through the cooperation of the double-shaft air cylinder 26 and the second air cylinder 35, and then the second air cylinder 35 drives the cutter 33 to reset. The first air cylinder 29 drives the polishing disc 31 to descend. The polishing disc 31 is driven to rotate by the operation of the motor 30, and the cut part is polished, so that the efficiency is high.

It needs to be noted that in this specification, relational terms such as first and second (number one or number two) are only used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a device that includes a list of elements not only includes those elements but also includes other elements that are not expressly listed, or further includes elements inherent to such a process, method, article, or device. In absence of more constraints, an element preceded by "includes a . . . " does not preclude the existence of other identical elements in the process, method, article, or user equipment that includes the element.

The basic principles, principal features and advantages of the present disclosure are shown and described above. Those skilled in the art should understand that the present disclosure is not limited by the above-described embodiments, the above-described embodiments and specification are merely illustrative of the principles of the present disclosure, various changes and modifications may occur to the present disclosure under the premise of without departing from the spirit and scope of the present disclosure, and these changes and modifications fall within the scope of the present disclosure as claimed.

What is claimed is:

1. A welding finishing device, comprising a base (1), wherein supporting rods (2) are fixedly mounted on a left side and a right side of an outer surface of an upper end of the base (1), a top plate (3) is fixedly mounted on outer surfaces of upper ends of the supporting rods (2), a finishing assembly (4) is fixedly mounted in a middle of an outer surface of a lower end of the top plate (3), a workpiece (6) is provided in a middle of the outer surface of the upper end of the base (1), a welding seam protruding part (5) is provided in a middle of the workpiece (6), positioning assemblies (7) are fixedly mounted on the left side and the right side of the outer surface of the upper end of the base (1), the finishing assembly (4) comprises a second sliding chute (24), a second sliding block (25), a double-shaft air cylinder (26), a mounting block (27), a second mounting plate (28), a first air cylinder (29), a motor (30), a polishing disc (31), a rotating shaft (32), a cutter (33), a mounting disc (34), a second air cylinder (35) and a movable block (36), the second sliding chute (24) is formed in the outer surface of the lower end of the top plate (1), the mounting block (27) is fixedly mounted on a right side of an outer surface of a lower end of the base (1), the double-shaft air cylinder (26) is fixedly mounted on an outer surface of the left side of the mounting block (27), and the second sliding block (25) is fixedly mounted on an outer surface of an upper end of the movable block (36).

2. The welding finishing device according to claim 1, wherein the positioning assembly (7) comprises a substrate (8), a first sliding chute (9), skidproof stripes (10), a squeezing plate (11), a first screw (12), a first knob (13), a first fixed block (14), a first threaded hole (15), a first sliding block (16), a compressing block (17), a second threaded hole (18), a second knob (19), a second screw (20), a first mounting plate (21) and a second fixed block (22), an outer surface of a lower end of the substrate (8) is fixedly connected with an outer surface of an upper end of the base (1), the first sliding chute (9) is formed in a middle of an outer surface of an upper end of the substrate (8), the first fixed block (14) is fixedly mounted on a left side of the outer surface of the upper end of the substrate (8), the second fixed block (22) is fixedly mounted on a right side of the outer surface of the upper end of the substrate (8), and the limited block (23) is fixedly mounted at a lower part of an outer surface of a left side of the second fixed block (22).

3. The welding finishing device according to claim 2, wherein the first threaded hole (15) is formed in a middle of the first fixed block (14), the first screw (12) penetrates through the first threaded hole (15), the first knob (13) is fixedly mounted on an outer surface of one end of the first screw (12), the squeezing plate (11) is located on an outer surface of another end of the first screw (12), the first sliding block (16) is fixedly mounted in a middle of an outer surface of a lower end of the squeezing plate (11), the first mounting plate (21) is fixedly mounted at an upper part of the outer surface of the left side of the second fixed block (22), the second threaded hole (18) is formed in a middle of the first mounting plate (21), the second knob (19) is fixedly mounted on an outer surface of an upper end of the second screw (20), and the compressing block (17) is located on an outer surface of a lower end of the second screw (20).

4. The welding finishing device according to claim 2, wherein the skidproof stripes (10) are provided on an outer surface of one side of the squeezing plate (11) and an outer surface of one side of the limit block (23), the first screw (12) and the first threaded hole (15) are in threaded connection, the second screw (20) and the second threaded hole (18) are in threaded connection, and the first sliding block (16) and the first sliding chute (9) are in sliding connection.

5. The welding finishing device according to claim 2, wherein a first sealing bearing is provided between the first screw (12) and the squeezing plate (11), the first screw (12) is movably connected with the squeezing plate (11) through the first sealing bearing, a second sealing bearing is provided between the compressing block (17) and the second screw (20), and the lower part of the second screw (20) is movably connected with the compressing block (17) through the second sealing bearing.

6. The welding finishing device according to claim 1, wherein the second mounting plate (28) is fixedly mounted on an outer surface of a lower end of the movable block (36), the second air cylinder (35) is fixedly mounted on a left side of an outer surface of a lower end of the second mounting plate (28), the first air cylinder (29) is fixedly mounted on a right side of the outer surface of the lower end of the second mounting plate (28), the mounting disc (34) is fixedly mounted on an outer surface of a lower end of the second air cylinder (35), the cutter (33) is fixedly mounted on an outer surface of a lower end of the mounting disc (34), the motor (30) is fixedly mounted on an outer surface of a lower end of the first air cylinder (29), the rotating shaft (32) is located on an outer surface of a lower end of the motor (30), the polishing disc (31) is fixedly mounted on an outer surface of a lower end of the rotating shaft (32), and the second sliding block (25) and the second sliding chute (24) are in sliding connection.

* * * * *